Aug. 21, 1962     O. RICE ETAL     3,050,144
APPARATUS FOR MEASURING WEIGHT LOSS OF
MEAT PRODUCTS IN THE SMOKE HOUSE

Filed Dec. 5, 1958     4 Sheets-Sheet 1

INVENTORS
OWEN RICE
DONALD M. STOUGH
BY Gerald B. Tjoflat
His Attorney

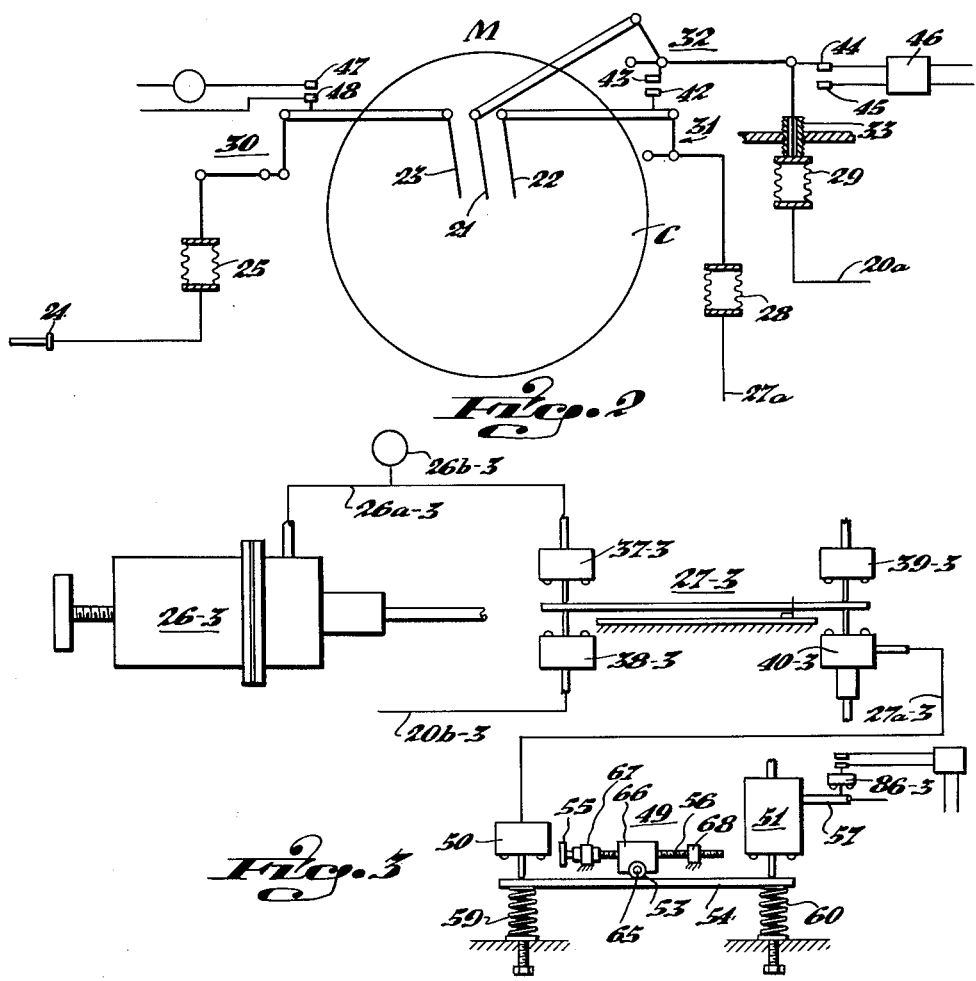

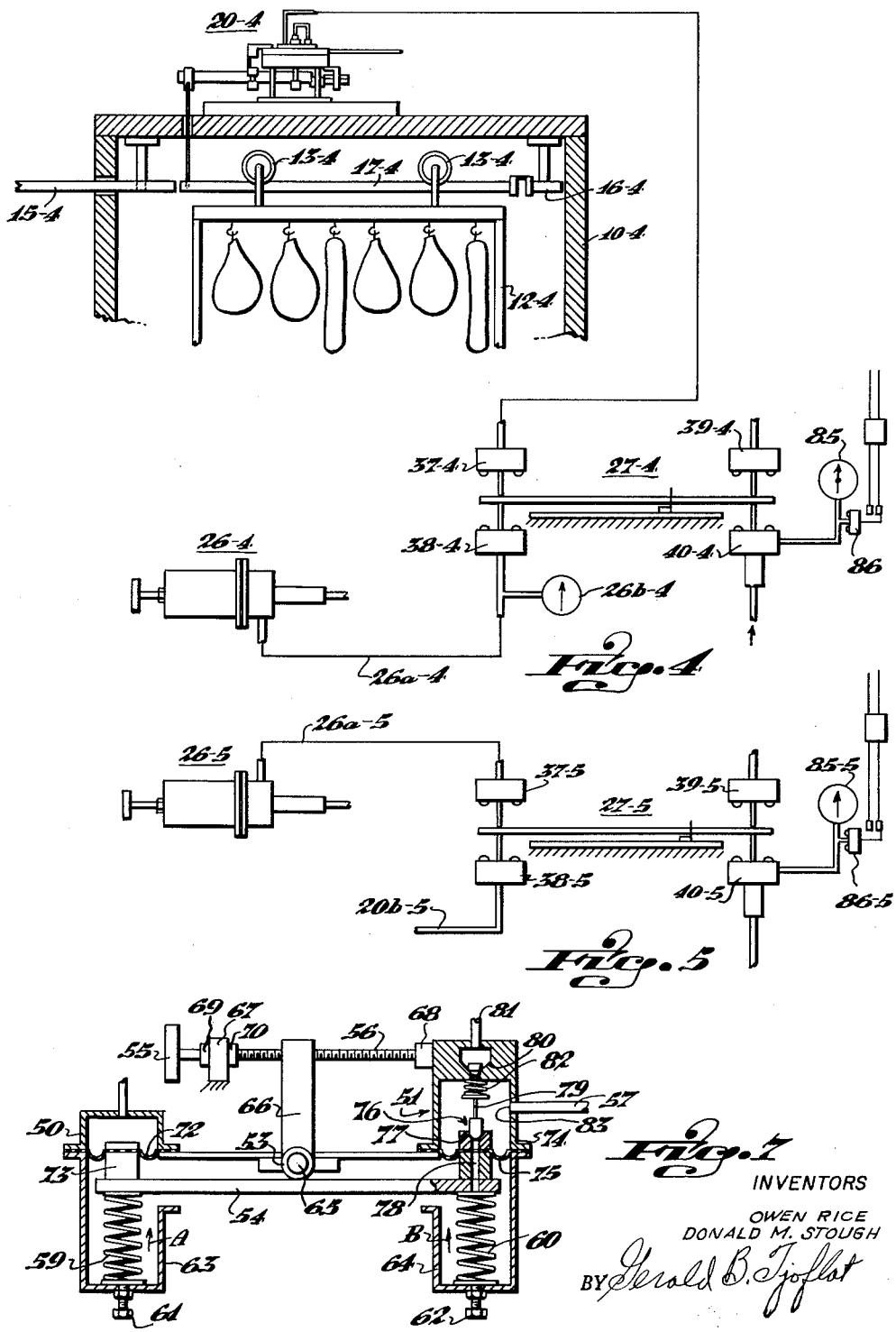

INVENTORS
OWEN RICE
DONALD M. STOUGH
BY Gerald B. Tjoflat

United States Patent Office 3,050,144
Patented Aug. 21, 1962

3,050,144
APPARATUS FOR MEASURING WEIGHT LOSS OF MEAT PRODUCTS IN THE SMOKE HOUSE
Owen Rice, Upper St. Clair Township, Allegheny County, and Donald M. Stough, Pittsburgh, Pa., assignors to Hagan Chemicals & Controls Inc., Pittsburgh, Pa., a corporation of Pennsylvania
Filed Dec. 5, 1958, Ser. No. 778,445
6 Claims. (Cl. 177—4)

This invention relates to smoke house operations and more particularly to a system for continuously weighing the product being smoked so that the smoking can be discontinued precisely when the desired weight loss has been achieved.

Meat products such as hams, bacon, wieners, bologna and the like, are usually impregnated with a pickle solution prior to smoking. In the meat curing industry a certain amount of pickle is injected into the meat products, usually the amount is a certain percentage of the weight of such product. After the pickle has been injected, the products are ready for the smoke house.

The products are smoked in the smoke house at not less than a minimum predetermined temperature until a certain weight loss has been achieved by evaporation of the water phase of the pickle. There is a certain amount of pickle lost by seepage, not only in the smoke house, but also between the time the pickle has been injected and the time the product is placed on "trees" in the smoke house.

Heretofore the problem of accurately weighing the meat products as pickled and as placed in the smoke house, and determining the weight loss during the smoking process, has been difficult to achieve with any degree of accuracy.

The desirability of continuously weighing a "tree" of sausage, hams, or bacons, while smoking has been recognized for many years. Strain gauges have been used but have proved entirely unsatisfactory because of their susceptibility to changes in temperature. The difficulties of continuously weighing have been increased because of the relationship between the large tare weight of the empty tree in comparison to one carrying a full load of wieners, for example. The large variation in weigh between a tree of wieners which are light in weight, and a tree of heavy hams, bacon or large bologna, and the relatively small loss in weight during smoking which is measured, recorded or controlled, also contribute to the difficulties.

An object of this invention is to provide a system which overcomes the aforementioned difficulties by utilizing a weighing device which can be installed outside of the smoke house and therefore is not affected by temperature and which automatically develops a balancing force that is proportional to the weight of the meat products on the tree. The force thus developed and which is proportional at all times to the weight of the products being smoked is checked against a preset force or signal so that when the smoke weight has decreased to the preset signal, an alarm or other operation is performed by which the smoke house operator knows with certainty that the smoking has been completed and the desired weight loss has been achieved.

A further object of the invention is to provide a system whereby a recording meter may be employed for registering the temperature of the meat products in the smoke house, the preset signal and the final weight signal, whereby overall accuracy of a high degree is achieved.

A still further object of the invention is to provide a system having a weighing apparatus which is capable of accommodating the tare weight so that the actual signal resulting from continuously weighing the meat products being smoked is directly proportional to that weight. Thus, at the commencement of a smoking operation, the weighing signal is directly proportional to the pickled weight of the products and when the smoking operation is completed, that signal will be directly proportional to the final weight desired and equal to the preselected signal.

A still further object is to provide a system in which the weight loss may be preset by means of a simple dial.

Other objects of the invention will be apparent to those of ordinary skill in the art to which the invention pertains from the following description taken in conjunction with the accompanying drawings.

In the drawings:

FIG. 2 is a more or less diagrammatic view of a recording meter embodied in the system of FIG. 1 which records temperature of the meat products, the preset final weight desired and which records the weight of the products being smoked from the initial to the final weight;

FIG. 3 is a view of a portion of the apparatus that may be embodied in the system of FIG. 1 which is provided with means for preselecting by a simple dialing operation, the final weight to be achieved;

FIG. 4 is a view similar to FIGURE 1 but embodying a simplified form of system for presetting the final weight and matching that final weight with the signal produced by the continuous weighing of the products being smoked;

FIG. 5 is a view similar to FIG. 4 modified to produce initially a signal that increases from zero to a preset maximum when the final weight is achieved, the system of FIG. 4 being so arranged that the signal starts at a maximum value and decreases or approaches zero as the final weight is achieved;

FIG. 7 is a more or less diagrammatic view of a ratio relay embodied in the system of FIG. 3.

Figure 1:
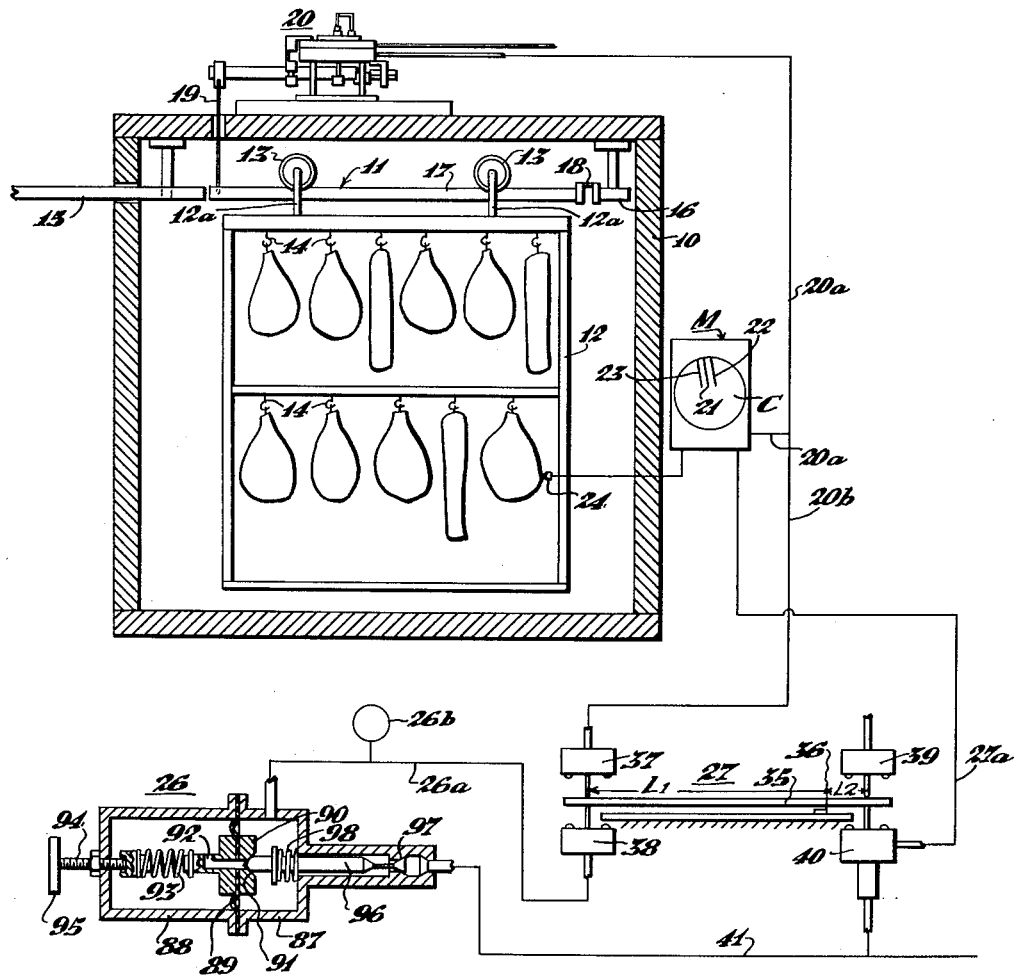
FIGURE 1 is a more or less diagrammatic view of a smoke house provided with a system for continuously weighing the meat products while the same are being smoked so that the final weight may be determined precisely and with accuracy.

In FIG. 1 of the drawing, a smoke house 10 is shown that is provided with a track 11 and a tree or trees 12, suspended by rods 12a from the axles of wheels 13 running on the track. The tree is provided with hooks 14, as shown, from which various pickled meat products are suspended, such as hams, bacon slabs, wieners, bologna and the like.

The track 11 is sectional and comprises rigidly supported sections 15 and 16 and a section 17 disposed between them and which is connected at one end by a fulcrum 18 to section 16 and supported thereby. The other or free end of section 17 is suspended by a rod 19 from a weighing apparatus or device 20 (see FIG. 8), mounted on the top and therefore at the outside of the smoke house chamber so as not to be affected by the chamber temperature.

The device 20 develops automatically a signal, such as a pneumatic pressure that is proportional to the total or gross weight of the tree and the products thereon. The tare weight of the tree can be measured before it is loaded with meat products. The net weight of the products before smoking is therefore the difference between the gross weight and the tare weight signals.

Device 20 transmits a signal through signal lines 20a and 20b, the signal in the former being delivered to a meter M having a plurality of recording pen arms 21, 22 and 23 for tracing records on a chart C. Pen arm 21 records continuously the net weight of the meat products from the beginning to the end of the smoking operation and shows the weight loss. Pen arm 22 records the preselected final weight desired and pen arm 23 records the temperature of the products as measured in one or more of the items on the tree.

The temperature signal is developed by a thermometer 24 embedded in a ham, for example, and that signal is delivered through a signal line 24a to a sensing device, such as a bellows 25 in the meter (see FIG. 2).

The preselected final weight signal is preset by a relay 26 (see FIG. 1) which develops a signal in a signal line 26a. The signals in lines 20b of device 20 and line 26a of relay 26 are impressed on a ratio totalizer 27 (see FIG. 6), which in turn develops a signal that is transmitted through a line 27a to a bellows 28 or other signal sensitive device in the meter that operates the desired final weight pen arm 22. The signal from device 20 as delivered to the meter M is impressed on a signal sensitive means, such as a bellows 29.

Bellows 25 expands as the temperature of the meat product rises and operates pen arm 23 through a system 30 of motion multiplying levers. By properly adjusting this lever system, the desired sweep or range of the pen can be obtained.

Bellows 28 positions pen arm 22 through a system of levers 31 so designed as to give the desired sweep or range of travel of the pen arm.

The bellows 29 operates through a system of levers 32 so designed as to provide the necessary sweep or range of motion of pen arm 21. Bellows 29 is provided with a tare weight adjustment 33 in the form of a screw-threaded bushing. By means of that adjustment, the pen arm 21 can be set to record the actual net weight of the meat products on the tree, that weight being the gross weight as represented by the output signal of device 20 less the tare weight.

The ratio totalizer 27, which is shown in detail in FIG. 6 and will be described fully infra, comprises a beam 35 mounted on a frictionless fulcrum 36, and diaphragm chambers 37, 38 and 39 and a pressure signal sending and balancing device 40. Device 40 develops a force proportional to its pressure signal and exerts that force on the beam to balance the clockwise motion of the beam resulting from the difference between the forces of the pressures developed by the diaphragms of chambers 37 and 38 and acting on the beam. The diaphragms of chambers 37 and 38 exert forces in opposite directions on beam 35 and at the same distance from the fulcrum 36. Chamber 39 may be supplied with a fixed loading pressure or it may be idle as shown in which case the diaphragm is exposed to atmospheric pressure. The areas of the diaphragms of chambers 37 and 38 are equal and when of unit area, the total force developed by each is equal to the pressure in pounds, applied to them.

Chamber 37 receives the signal of weighing device 20 through the signal line 20b and chamber 38 receives the set point signal of the hand sender 26 through line 26a. The signal supply—such as air pressure at constant value—is supplied to sender 26 and the signal sending device 40 by a supply pipe 41.

Since the signals in lines 20a–20b are equal but decreasing in value as the meat products in the smoke house lose weight, the loading signal from sender 26 is set to a value which is lower than the initial signal in line 20b and equal to the amount by which the meat products are to be decreased in weight during the smoking operation. To that pressure is added a pressure that corresponds to the percentage of weight loss. Thus, so long as the signal in line 20b is above that of sender 26, the output signal of device 40 will be zero. But as soon as the signal decreases to a value less than the signal in line 26a, device 40 transmits a signal which increases as the signal in line 20b decreases further. When the output signal of ratio totalizer 27 reaches a predetermined value as determined by the pressure in line 26a, and acting on chamber 38, the smoking operation has been completed.

As shown, the lever arm $L_1$ for chambers 37, 38 is greater than lever $L_2$ for the signal sending and balancing device 40; thus, the output signal from device 40 will be proportional to $L_1/L_2 x$ (P26a–P26b), P26a and P26b being the pressures in chambers 37 and 38, respectively. When the signal in line 20b has fallen a predetermined amount, the signal from device 40 will have reached the value at which the smoking has been completed. That condition is indicated on chart C and it may also be used to sound an alarm or flash a signal. Since the pressure in bellows 28 increases when the output signal of totalizer 27 increases and the pressure in bellows 29 decreases as the smoked weight of the meat products decreases, it follows that pen arms 21 and 22 will move in opposite directions as the weight of the meat products approach their final weight. The opposite motions of the pen arm lever systems 31 and 32 may be utilized to actuate alarms or signal devices.

The signal may, for example, be established by the closing of electric contacts 42, 43 carried by the lever systems 31 and 32 (see FIG. 2). One or the other of these contacts may be adjustable in order to cause the signal or alarm to be energized at the correct moment. The lever system 32 may also be provided with contacts 44, 45 which close when the weight of the smoked meat products have dropped to their final value and thereby energize a signal or alarm 46. Likewise, the motion of the temperature lever system 30 may be utilized to close contacts 47, 48 to initiate an alarm or signal when the temperature of the meat products has reached a minimum value, that value being the minimum value required by health authorities.

The systems shown in FIGS. 1 and 2 require the calculation of the pressure required to be sent out by the hand sender 26 in order that the meter and the alarms may properly indicate when the smoking operation has been completed. Thus, the pressure selected for sender 26 may be set to give a pressure of 10 pounds when the final weight has been reached which would correspond to a weight loss of 10% from the initial weight of the meat products as and when they were placed in the smoke house.

In FIGURE 3, a system like that of FIG. 1 is shown to which has been added a means 49 whereby the percentage weight to be achieved in the smoke house may be "dialed," that is, by the turning of a knob or hand wheel, the motion of the pen arm 21 may be amplified or de-amplified in such a manner as to bear a definite ratio to the output signal of the ratio totalizer 27–3. Ratio relay 49 may be of the type shown and described in U.S. Patents Nos. 2,016,824 and 2,304,783. The input signal to relay 49 is received by a diaphragm chamber from totalizer 27–3 through line 27a–3. As above indicated, the devices and signal lines of FIG. 3 corresponding to the same devices and lines of FIGS. 1 and 2 are identified by the same reference characters followed by "–3."

Relay 49 is provided with a signal sending and balancing device 51 that generates a signal which is proportional to and bears a definite ratio to, the signal input to chamber 50. The ratio of the input signal to the output signal can be adjusted at will by a fulcrum 53 that is adjustable along the top of beam 54 by means of a hand wheel 55 and a screw 56. The output signal is delivered to a line 57 and by it and line 27a to bellows 28 of meter M.

As will be shown infra, the performance of relay 49 for every condition of balance between input and output pressures, is illustrated by the equation $(A-x)=k(B-y)$.

Ratio relay 49, as shown more in detail in FIG. 7, comprises the beam 54 supported at each end by springs 59 and 60. These springs urge the beam against the fulcrum when the relay is out of balance as between the input signal to chamber 50 and the output signal of the device 51. The tension of these springs may be adjusted by screws 61 and 62 having threaded engagement with the outer (lower) ends of spring housings 63 and 64, respectively. The maximum forces exerted against the beam by springs 59 and 60 may be designated A and B, respectively.

The fulcrum 53 comprises a roller rotatably mounted on a pin 65 carried by a block 66 through which the screw 56 extends and with which it has screw thread engagement. The screw 56 is journaled in bearings 67 and 68 and provided with stop collars 69, 70, pinned to the screw on each side of bearing 67 to prevent lengthwise movement of the screw. Thus, by turning the screw 56 right or left, the fulcrum block 66 and its fulcrum can be moved right or left along the beam. In this manner, the ratio of lever arms $L_1$ and $L_2$ can be changed from a value of 1:1 to values greater than or less than 1:1.

Diaphragm chamber 50 includes a diaphragm 72 that is clamped at its margin to the open end of the chamber housing as shown. The middle portion of the diaphragm is provided with a push rod assembly 73 that engages the beam 54 at a location directly opposite the center of action of spring 59 on the beam. If the effective area of diaphragm 72 is equal to unity, the force exerted by the diaphragm on the beam is equal in pounds, to the pounds per square inch of the pressure in the chamber, that is, $x$ lbs/sq. in. in the chamber develops $x$ lbs. of force on the beam 54. Thus, the force of diaphragm 72 may be called "$x$."

Device 51 comprises a housing 74 to the open end of which a diaphragm 75 is clamped at its margin. The central portion of the diaphragm is secured to an exhaust valve seat assembly 76 that engages beam 54 at a location directly opposite the line of action of spring 60 on beam 54. The assembly 76 includes a valve seat 77 leading to an exhaust port 78 by which pressure is exhausted to the atmosphere.

The exhaust seat 77 is controlled by one end of a valve stem 79, the opposite end of which controls an inlet port seat 80 to which pressure at constant value is supplied by a pipe 81. The valve stem is biased by a light spring 82 in a direction tending to urge the stem to a position where the inlet port is closed. The housing 74 is provided with a sending port 83 to which the sending line 57 is connected, that line leading to bellows 28 of FIG. 2.

Assuming the forces of springs 59 and 60 are A and B pounds, respectively, the force developed by the input pressure to chamber 50 is $x$ pounds and the force developed by the output pressure in device 51 is $y$ pounds, and the ratio of $L_1/L_2 = k$, then the beam 54 is in balance when $(A-x) = k(B-y)$. The value of $k$ can be equal to or greater or less than unity.

Thus, the value of the output pressure $y$ will ratio about zero as shown in the aforementioned patents, thus making it possible to so preset the system by adjusting the fulcrum 53 that it is not necessary to calculate the output pressure of the hand sender 26 for each load of meat products.

Thus, in the operation of the system, the totalizer 26 is adjusted for example, to provide a ratio of $L_1/L_2 = 3.33:1$; the pointer 22 is zeroed by adjusting the pressure from the hand sender 26 to a value at which the pressure in chambers 37 and 38 are equal. Then as the meat products lose weight, the output pressure of the ratio relay 49 will increase until the pen arm 22 has reached the desired weight loss position.

In the operation of the system of FIG. 3, the ratio of the lever arms $L_1/L_2$ is preferably adjusted to a value of say 3.33:1 more or less. Thus, the output signal to pipe 27a–3 will be three times the difference between the pressures in the chambers 37–3 and 38–3. By means of the ratio totalizer 49, the output pressure of ratio totalizer 27 may be multiplied at the ratio required for the weight loss to be achieved by merely dialing the fulcrum along the beam 54. Thus, if the multiplication of the output pressure of the totalizer 27 is 10:1, the weight loss will be 10% when the pen arms 21 and 22 are at the same point on the chart C.

By adjusting fulcrum 53, the percentage weight loss can be dialed to 8% weight loss in which case the multiplication ratio is 12.5:1. At the 8% weight loss, the pen arm 22 will read zero.

In FIGURE 4 a system is shown in which the meter M is omitted. It embodies the same components otherwise and these are identified by the same reference characters with (–4) added. Pressure 37–4 of ratio totalizer 27–4 receives pressure from the weighing device 20–4. Chamber 38–4 receives pressure from the hand sender 26–4. That pressure may be measured by a gauge 26b–4. Likewise, the output pressure of totalizer 27–4 may be measured by a gauge 85. As the meat products lose weight, the output pressure of totalizer 27–4 increases. When the final weight is reached, a pressure alarm or signal switch 86 is closed. Thus, the pressure setting of the sender 26–4 determines the final weight to be achieved.

In FIG. 5, an arrangement similar to the one in FIGURE 4 is shown with this difference—the pressure of relay 26–5 is applied to chamber 37–5 of totalizer 27–5 while the pressure signal of weighing device 20–5 is applied to chamber 38–5. Therefore, since, at the beginning of the smoking operation the pressure in chamber 38–5 is greater than in 37–5, the output pressure of device 40–5 will correspond to the weight loss to be achieved. Consequently, as the meat products lose weight, that output pressure will decrease to zero when the final weight has been achieved.

The connections of the hand sender 26 and the signal line 20b of device 20 may be reversed in FIG. 1 to correspond with the connection shown in FIG. 3.

Figure 6:
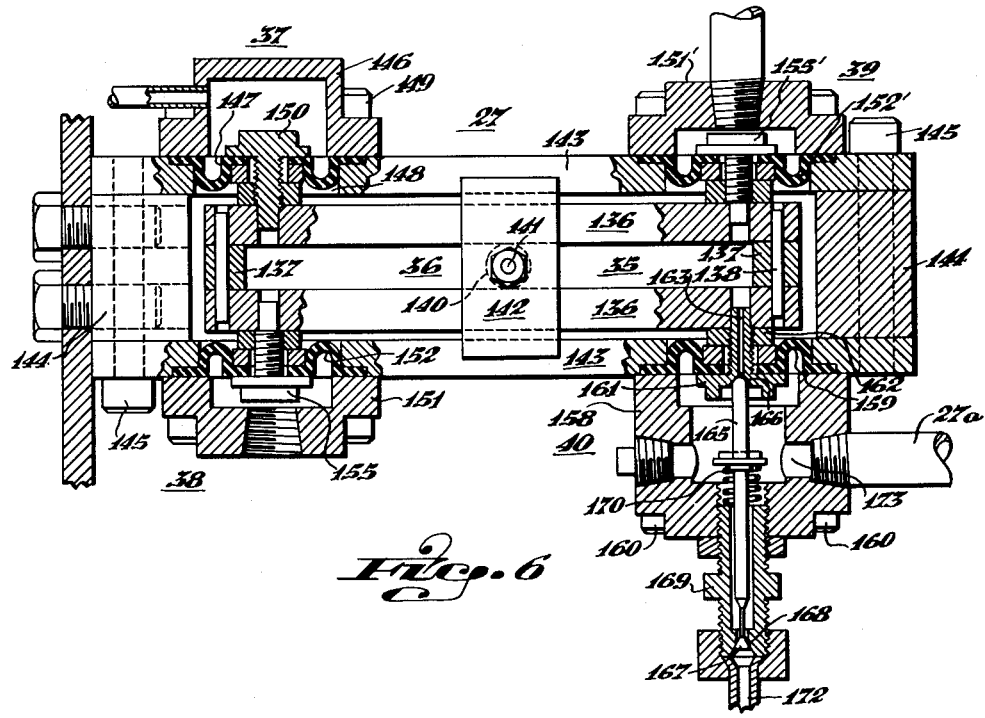
FIG. 6 is a view of a ratio relay embodied in the system of FIGS. 1, 3, 4 and 5.
Figure 8:
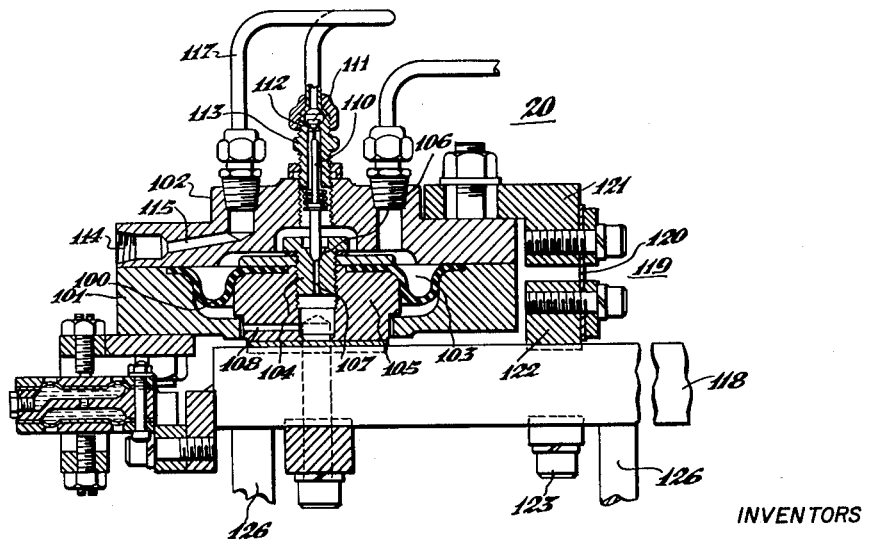
FIG. 8 is a view in section of a device embodied in FIGS. 1 and 2 that continuously weighs the meat products while they are being smoked and generates a signal that changes continually in direct proportion to the change in weight of the products.

In the following, the hand sending relay 26, the weighing device 20 of FIGS. 1 and 4, as shown in detail in FIG. 8 and the ratio totalizer 27 as shown in detail in FIG. 6, are described in detail.

Hand Sender 26

Sender 26 comprises a pressure chamber 87, a spring housing 88 and a diaphragm 89, the marginal edge of which is clamped between the chamber 87 and the housing. An exhaust valve seat assembly 90 is secured to the central portion of the diaphragm, and includes an exhaust valve seat 91 and exhaust port 92 leading to the atmosphere. A spring 93 is connected to assembly 89 as shown at one end and at the other end to a screw 94 having threaded engagement with the end of the housing. The screw may be provided with a hand wheel 95 for advancing or retracting the screw to thereby increase or decrease the spring force on the diaphragm.

The exhaust valve seat 91 is controlled by one end of a valve stem 96, the other end of which controls an inlet valve port seat 97 to which the pressure supply pipe 41 is connected. The stem is provided with a light bias spring 98 urging the valve towards seating position on the inlet seat.

If it be assumed that the area of diaphragm 89 is unity and that the force of the spring 93 against the diaphragm is in pounds, then the valve stem will open and exhaust pressure into the chamber until the force of the pressure is equal to the spring force. That is, the pressure which is transmitted by pipe 26a to the ratio totalizer 27, and it can be adjusted up or down in value by adjusting the force of the spring 93 on the diaphragm.

Weighing Device 20

Device 20 comprises a diaphragm 100 whose marginal edge is clamped between a centrally apertured base member 101 and a bonnet 102 thus forming a pressure tight chamber 103. The central portion of the diaphragm is clamped between an exhaust valve 104 and a thrust block 105. As shown, the exhaust valve is on the inside of chamber 103, extends through the diaphragm and is threaded into the block 105. Valve 104 has a seat 106 and an exhaust passage 107 that communicates through a port 108 with the atmosphere.

The pressure in the diaphragm chamber 103 is controlled by a valve stem 110, the lower end of which controls the exhaust port seat. The upper end includes a valve 111 that controls the inlet port 112 in a valve body 113 to which pressure of constant value is supplied through a port 114 and passage 115 in the bonnet 101 and a pipe connection 117. The body 113 is screwed into the bonnet as shown.

Upward thrust on the diaphragm is applied through block 105 and lifts the valve off the inlet port seat, thereby admitting pressure to chamber 103 until the total force of the pressure on the diaphragm equals the thrust. When that occurs, the inlet and exhaust ports are closed. If the thrust decreases, the exhaust port is uncovered, allowing pressure to exhaust to the atmosphere until there is equilibrium between the total force of the pressure on the diaphragm and the upward thrust.

The thrust on the block 105 is applied by a lever 118 mounted on a fulcrum 119. The link 19 (FIG. 1) is connected to the lever 118 at or near the outer end thereof and supports the load of the tree and the meat products thereon.

The fulcrum 119 may comprise a strip of spring steel 120 secured at one end to a bracket 121 bolted to the bonnet 102 and at the other end to a yoke 122 secured to the lever 118 by a bolt 123.

The bonnet 102 has an outlet port 125 to which the weight signal line 22a is connected. That pressure is linearly proportional to the gross weight of the tree 12 and the products thereon.

To stabilize the weighing device and prevent buzzing of valve 110, a damping device 126 may be provided. The stationary part 127 is secured to the lever 118 while the flexing diaphragms 128, 129, are disposed to engage stops 130 carried by the base 101. The diaphragms are separated by a partition 131 having an orifice 131a therein and the space within the damper is filled with a viscous fluid as for example mercury. Thus relative motion between the lever 118 and the base 101 results in the transfer of fluid through the orifice 131a from one side or the other of the partition, thereby damping the diaphragm lever system as disclosed in Patent No. 2,593,906.

*Ratio Totalizer 27*

The ratio totalizer comprises the beam 35, the diaphragm chambers 37, 38 and 39 and the pressure sending and balancing device or unit 40. As shown, the beam 35 comprises spaced beam members 136, the spacing being provided by spacing blocks 137 at the ends thereof and secured by means of pins 138. The fulcrum 36 comprises a roller 140 mounted on an axle, 141, supported by end plates 142, only one of which is shown, there being one on each side of the beam members 136. The members 142 are slidable along the beam and disposed between frame members 143 secured at their ends to spacer blocks 144 by bolts 145.

Diaphragm chamber 37 comprises a housing 146 across the open end of which is a diaphragm 147. The upper frame member 143 as shown is apertured as at 148 to accommodate the diaphragm. The marginal edge of the diaphragm is clamped between the frame member 143 and the lower face of the housing 146 by means of bolts 149. The central portion of the diaphragm is provided with a thrust member 150 by which the force developed by the diaphragm is transmitted to the beam 35.

The pressure chamber 38 comprises a bonnet or housing 151 across the open end of which is a diaphragm 152. The bottom frame member 143 is apertured as shown to accommodate the flexing portion of the diaphragm. The central portion of the diaphragm is provided with a thrust member 155 by which the force of diaphragm 152 is transmitted to the beam 36.

The diaphragm chamber 39 is identical in construction to the diaphragm chamber 38. Therefore, similar and corresponding parts are identified by the same reference characters with primes affixed. The diaphragm 152' may be loaded with a preset loading pressure or, as in the case of the systems herein disclosed, it may be vented to the atmosphere as shown.

The signal developing and balancing unit 40 comprises a housing 158 and a diaphragm 159. The lower frame member 143 is apertured to receive the flexing portion of the diaphragm as shown. The marginal edge of the diaphragm is clamped between the open face of the housing 158 and the frame member 143 as shown, bolts 160 being employed for effecting the clamping.

The central portion of the diaphragm 159 is provided with an exhaust valve assembly that comprises an exhaust valve member 161 that extends through the diaphragm as shown and which is clamped to the diaphragm by means of a nut 162. The shank or projecting end of the member 161 is provided with a passage 163 that leads to the atmosphere. The pressure at any moment within the housing 158 is controlled by a valve stem 165. The one end of that stem controls the exhaust port seat 166 and the other end is provided with a valve 167 that controls an inlet port seat 168 formed in a valve body 169. The body 169 is threaded into the housing 158 as shown. A light spring 170 urges the valve stem 165 in a direction to close the inlet valve seat 168. Pressure is supplied to the inlet valve port seat 168 by means of a supply pipe 172, that pressure being at a constant value. The body 158 is provided with an outlet port 173 to which the sending line 27a is connected.

When the difference between the pressure supplied to chambers 37 and 38 is such as to urge the beam 36 counterclockwise, the pressure in the housing 158 will be at atmospheric. But when the pressure difference is such as to effect clockwise rotation of the beam about its fulcrum, the pressure developed in the housing 158 will be such as to balance that clockwise pressure differential. By adjusting the lever arms $L_1$ and $L_2$, the pressure required in housing 158 to balance the clockwise turning force produced by the pressure in chamber 38 will be either greater or less than the pressure in that chamber. Thus, if the ratio of the lever arms $L_1/L_2$ is for example 3:1, the pressure required to balance the clockwise turning force of the pressure in chamber 38 will be three times the pressure applied to the diaphragm chamber 38. If the lever arm ratio is greater than that, a higher pressure will be developed in the housing 158.

The ratio of the lever arms $L_1/L_2$ depends upon the percentage of weight loss required with respect to the total weight acting on the weighing device 20. Thus the smaller the weight loss in is terms of pounds with respect to the total weight, the more multiplication will be required by increasing the ratio of $L_1/L_2$.

From the foregoing, it will be apparent that the systems herein disclosed make it possible to charge a smoke house with a load of pickled meat products and to accurately determine when the smoking operation has been completed by the controls provided by the hand sending devices, the ratio totalizers and the ratio relay. The weight loss may be controlled precisely, thereby avoiding the necessity of removing products from the smoke house, weighing them and then putting them back in the smoke house in the event the pickle has not been sufficiently removed to meet the standards of inspection. It will therefore be apparent to those of ordinary skill in the art to which the invention pertains, that various modifications and changes may be made without departing from either the spirit or the scope of the invention.

Therefore, what is claimed as new and desired to be secured by Letters Patent is:

1. Apparatus for measuring the loss of weight in pickled meat products while being smoked on a tree in a smoke house, said apparatus comprising a weighing apparatus adapted to support the trees and having means for generating a pneumatic signal the magnitude of which is directly proportional to the weight of the products, means for producing a constant but adjustable pneumatic reference signal directly proportional to the final smoked weight of the meat products, a ratio totalizer comprising a fulcrumed beam and two separate pressure deflectable means disposed to exert contra turning forces on said beam, one of said pressure deflectable means being responsive to said constant signal and the other being responsive to the signal of the weighing apparatus, and means actuated by said beam for developing a signal that establishes that the final weight of the smoked products has been achieved.

2. Apparatus as in claim 1 having a meter provided with a chart, and pen arms provided with means for actuating them in response to the signal generated by said weighing apparatus and the final weight signal of said beam actuated signal means, respectively, whereby the smoked weight is continuously recorded and the final weight established on said chart.

3. Apparatus as in claim 2 in which the meter is provided with alarm means which is energized when the final weight pen arm reaches the final weight desired.

4. Apparatus as in claim 2 including means for subtracting from at least one of said signals a value which is a function of the weight of said tree.

5. Apparatus for measuring the loss of weight in pickled meat products while being smoked on a tree in a smokehouse, said apparatus comprising (a) a weighing apparatus adapted to support the tree, and having means for generating a pneumatic weighing signal the magnitude of which is directly proportional to the weight of the products, (b) means for producing a constant but adjustable pneumatic reference signal proportional to the final smoked weight of the meat products, (c) a ratio totalizer including means for generating a pneumatic output signal and having a fulcrumed beam and two separate pressure deflectable means disposed to exert contra turning forces on said beam, one of said pressure deflectable means being responsive to said constant reference signal and the other being responsive to the signal generated by said weighing apparatus, (d) an adjustable ratio relay having means responsive to the output signal of said ratio totalizer and means for developing a pneumatic relay output signal, and (e) adjustable means for establishing a predetermined ratio between said ratio totalizer output signal and said relay output, whereby the final weight signal may be achieved by adjustment of said adjustable means.

6. Apparatus as in claim 5 in which the fulcrum of the ratio totalizer is adjustable.

References Cited in the file of this patent

UNITED STATES PATENTS

| | | |
|---|---|---|
| 92,083 | Morrison | June 29, 1869 |
| 892,298 | Palmer | June 30, 1908 |
| 1,778,702 | Bristol et al. | Oct. 14, 1930 |
| 2,266,566 | Poole | Dec. 16, 1941 |
| 2,545,118 | St. Clair | Mar. 13, 1951 |
| 2,581,205 | Reilly | Jan. 1, 1952 |
| 2,755,731 | Hensgen et al. | July 24, 1956 |
| 2,938,626 | Dahms | May 31, 1960 |